United States Patent [19]
Fuller et al.

[11] Patent Number: 5,795,038
[45] Date of Patent: Aug. 18, 1998

[54] HYDRAULIC VALVE CONTROL UNIT FOR VEHICULAR ANTI-LOCK BRAKE AND TRACTION CONTROL SYSTEMS

[75] Inventors: Edward N. Fuller, Manchester; Herbert L. Linker, Jr., Dexter; Gerald M. Sivulka; Wendell D. Tackett, both of Ann Arbor, all of Mich.

[73] Assignee: Kelsey-Hayes Company, Romulus, Mich.

[21] Appl. No.: 692,483

[22] Filed: Aug. 6, 1996

Related U.S. Application Data

[60] Provisional application No. 60/002,011, Aug. 7, 1995.

Related U.S. Application Data

[63] Continuation-in-part of Ser. No. 511,900, Aug. 7, 1995, abandoned, and a continuation-in-part of Ser. No. 511,973, Aug. 7, 1995, Pat. No. 5,681,097, each is a continuation-in-part of Ser. No.198,365, Feb. 18, 1994, Pat. No. 5,439,279.

[51] Int. Cl.$^6$ .................................................. B60T 8/36
[52] U.S. Cl. ............................................... 303/119.2
[58] Field of Search .......................... 303/119.1, 119.2, 303/84.2; 137/452.2; 251/129.02, 129.15

[56] References Cited

U.S. PATENT DOCUMENTS

| | | | |
|---|---|---|---|
| 5,401,087 | 3/1995 | Goossens | 303/119.2 |
| 5,439,279 | 8/1995 | Linkner, Jr. et al. | 303/119.2 |
| 5,443,309 | 8/1995 | Beck | 303/119.2 |
| 5,476,313 | 12/1995 | Lauer | 303/119.2 |
| 5,542,755 | 8/1996 | Staib et al. | 303/119.2 |

*Primary Examiner*—Robert J. Oberleitner
*Attorney, Agent, or Firm*—MacMillan, Sobanski & Todd

[57] ABSTRACT

A valve control unit for anti-lock and traction control systems for automotive vehicles and valve structures for the valve control unit. The valve control unit has a valve body housing having cylindrical cavities for receiving the internal portion of the valves and a counterbore forming an annular shoulder. Each valve has a radial flange received in the counterbore and seated on the annular shoulder. The periphery of the counterbore is swaged to form an inwardly directed annular lip securing the radial flange in the counterbore. The swaged annular lip also forms a fluid tight seal between the radial lip and the valve body housing. The annular lip is formed by a swaging tool orbited in a rosette pattern. The swaging of the annular lip permits closer spacing between the valves reducing the size and weight of the valve control unit.

47 Claims, 12 Drawing Sheets

HYDRAULIC VALVE CONTROL UNIT FOR VEHICULAR ANTI-LOCK BRAKE AND TRACTION CONTROL SYSTEMS

CROSS-REFERENCE TO RELATED APPLICATIONS

This application is a continuation-in-part of Ser. No. 08/511,900, filed Aug. 7,1995, now abandoned, and a continuation-in-part of application Ser. No. 08/511,973, filed Aug. 7, 1995, which issued at U.S. Pat. No. 5,681,097 on Oct. 28, 1997, and also claims the benefit of U.S. provisional application Ser. No. 60/002,011, filed Aug. 7, 1995. Each of applications Ser. No. 08/511,900 and Ser. No. 08/511,973 is a continuation-in-part of application Ser. No. 08/198,365, filed Feb 18, 1994, which issued as U.S. Pat. No. 5,439,279 on Aug. 8, 1995.

BACKGROUND OF THE INVENTION

This invention relates in general to hydraulic valve control units for anti-lock and traction control systems for vehicular applications and, in particular to the design and method of manufacturing the hydraulic valve control units and the individual solenoid actuated valves embodied in the hydraulic valve control units.

Many automotive vehicles being produced today are equipped with hydraulic brake systems which include anti-lock brake systems (ABS) and traction control (TC) systems. As is known in the art, the anti-lock brake systems inhibit the wheels from locking up during sudden or panic applications of the brake. The traction control system is used to provide engine power to the driven wheel having the highest wheel-to-road friction. The anti-lock brake and traction control systems are considered by many to be the most significant improvement in vehicle safety within the last decade and are presently being offered as standard equipment on many automotive vehicles.

The hydraulic valve portions of most anti-lock brake systems and traction control systems are embodied in a singular compact hydraulic valve control unit, usually in the form of an aluminum block in which there is incorporated the valves and other components necessary to provide the desired anti-lock braking or traction control functions. The hydraulic valve control unit for the anti-lock brake system includes solenoid actuated isolation valves for isolating the wheel brakes from the hydraulic braking force exerted by the master brake cylinder in response to the depression of the vehicle's brake pedal. The hydraulic control unit also includes solenoid actuated hold/dump valves which are activated by an electronic control to dump or reduce the pressure of the hydraulic fluid being applied to the brakes, thereby relaxing the braking torque to prevent wheel lockup. The hydraulic control unit may also include low pressure accumulators and a hydraulic pump to allow fast dumping of the brake pressure and to pump the dumped brake fluid back to the master brake cylinder for subsequent anti-lock cycles of a stop.

The control unit for a traction control system has substantially the same components, which are activated by an electronic control unit to apply a braking torque to the driven wheel of the vehicle which has the lower wheel-to-road friction. By applying a braking torque to the wheel having the lower wheel-to-road friction, the engine torque is directed to the driven wheel having the higher wheel-to-road friction.

The isolation valves, hold/dump valves, accumulators and other components including the electrically driven hydraulic pump are mounted on or in the aluminum block bored as required to receive these components and provide fluid communication passageways between these components as required.

Improved reliability and reductions in weight, size and manufacturing costs of the control unit as well as each hydraulic valve in the control unit are of prime importance. The manufacturing costs are related to the number and complexity of the machining operations and the number and complexity of the assembly operations of each control unit component and the control unit itself.

In the early stages of development of the hydraulic valve control units, typified by the general structure shown in U.S. Pat. No. 4,828,335, assigned to the assignee of the present invention, the solenoid actuated isolation valves and the solenoid actuated solenoid hold/dump valve were threaded into the aluminum block. These valves included a hexagonal-shaped flange to facilitate the rotation of the valve body. This hexagonal-shaped flange is adapted to receive a standard size socket wrench by means of which the valve body can be secured to the aluminum block with sufficient torque to maintain the control valve secure within a threaded bore formed in the aluminum block. The hexagonal flange limited the spacing between the individual solenoid actuated valves such that the size of the aluminum housing was relatively large.

The threaded bores in the aluminum block and the corresponding threaded portion of the valve body were eliminated by Linkner, Jr. in U.S. Pat. No. 5,364,067, assigned to the assignee of the present invention, as shown in FIG. 3 herein. In the control valve taught by Linkner, Jr., the valve body is secured within the bore of the aluminum block by a snap ring. A recessed annular groove is provided in the aluminum block to receive the snap ring. A wave washer resiliently holds a radial flange of the valve body against the snap ring. U.S. Pat. Nos. 4,828,335 and 5,364,067 are hereby reference as teachings of the prior art.

SUMMARY OF THE INVENTION

The invention relates to a hydraulic valve control unit for an anti-lock brake system having reduced size and weight. The invention further contemplates a hydraulic valve control unit which eliminates threaded components for mounting the valves to the valve housing. The invention further contemplates a hydraulic valve control unit which has minimal machining and assembly operations to significantly reduce its costs. The invention further contemplates solenoid actuated valve assemblies which are adapted to be swaged into the valve housing and are of a design and in a manner adapted to produce a reliable mechanical lock and a reliable fluid seal.

A hydraulic valve control unit for the anti-lock brake system has an isolation and a hold/dump valve for each wheel of the vehicle which is controlled during the anti-lock braking system. Each of the isolation and hold/dump valves has an internal portion, an external portion, a radial flange intermediate the internal and external portions and an armature displaceable in response to a magnetic field. The control unit further has a valve body housing having a cylindrical cavity receiving a respective one of the internal portions of the isolation and hold/dump valves. Each cylindrical cavity further includes a counterbore sized to receive the radial flanges of the isolation and hold/dump valves when their internal portions are disposed in its respective cylindrical cavity. An annular shoulder is formed at the bottom of each counterbore forming a seat for the radial flange. The valve body housing further has a swaged annular lip formed about the perimeter of the radial flange which locks the radial flange onto the shoulder and forming a leak-tight fluid seal between the radial flange and the valve body housing.

Other hydraulic components such as the low pressure accumulator will be similarly constructed and retained within the housing. Likewise, where traction assist is integrated in the same housing further components including pilot operated switching valves, high pressure accumulators and the like will be similarly constructed such that these valve-like components are threadless and permanently affixed in the control unit. Rather than repair the control unit or replace individual components, the invention contemplates a non-reusable control unit, which may simply be replaced.

The valve body housing further includes internal passageways connecting the isolation valves and the hold/dump valves to each other and to selected input and output ports.

In a preferred anti-lock brake system embodiment, the valve body housing has at least one low pressure accumulator, a hydraulic pump and internal passageways connecting the isolation valve to the output of the pump, the hold/dump valve to the low pressure accumulator, and the low pressure accumulator to the input of the pump.

In the aforementioned preferred embodiment, the valve body housing is swaged inwardly by a swaging tool orbited in a rosette pattern to form the annular lip such that the annular lip has a uniform thickness.

As part of each preferred embodiment, the control unit has a coil-integrated module attachable to the valve body housing. The coil-integrated module has a solenoid coil assembly which includes a flux ring, for each isolation and hold/dump valve mounted in the valve body housing. Each solenoid coil assembly circumscribes the external portion of an associated isolation or hold/dump valve and is slidably received over the armature sleeve as the coil-integrated module is detachably secured to the valve body housing.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
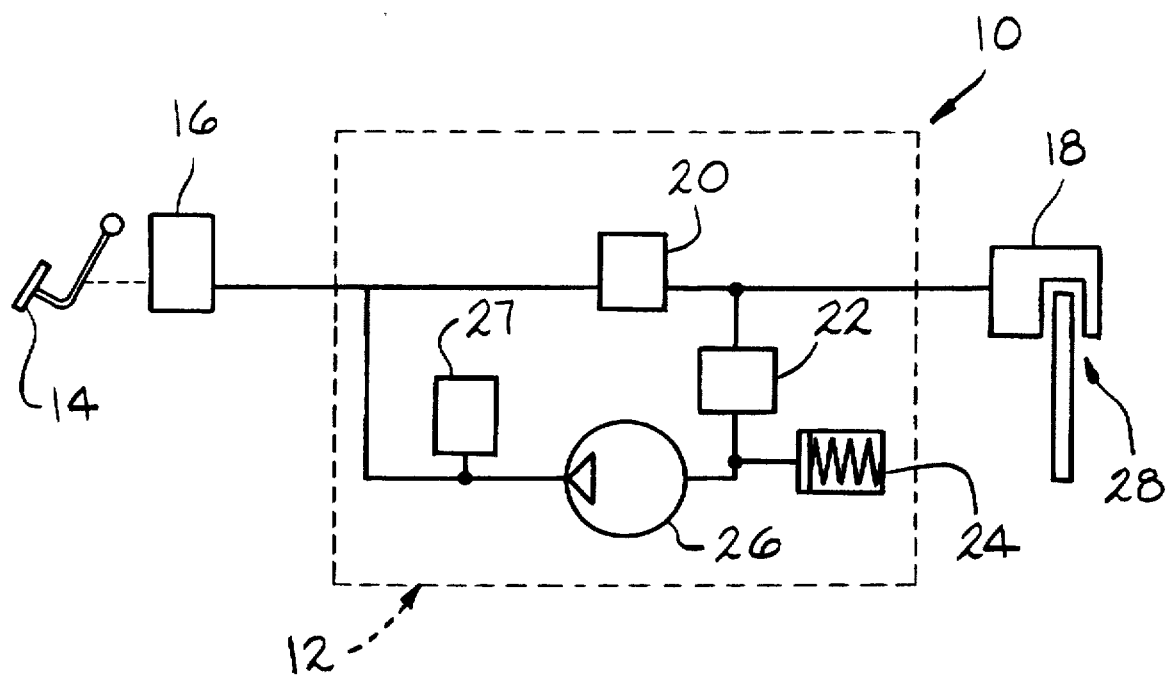
FIG. 1 is a schematic representation of a braking system for an automotive vehicle including an anti-lock hydraulic valve control unit according to the present invention.

A schematic diagram of a braking system 10 for one wheel of an automotive vehicle is illustrated in FIG. 1. The braking system 10 includes a hydraulic control unit 12 formed as a housing containing valve and other components as described below. For purposes of clarity of illustration, only one set of components are illustrated in the schematic representation of FIG. 1. Typically, however, the hydraulic control unit 12 also embodies corresponding components for the other wheels of the vehicle in a well known manner.

The braking system 10 also includes a master brake cylinder 16 responsive to the depression of a brake pedal 14 to provide pressurized brake fluid to a slave cylinder 18 of a wheel brake assembly 28 associated with each wheel of the vehicle. In the embodiment illustrated in FIG. 1, the wheel brake assembly 28 is a disc brake assembly; however, the wheel brake assembly 28 may be a drum brake assembly or any other type of hydraulic brake assembly found on automotive vehicles.

The hydraulic control unit 12 includes normally open isolation valves 20 disposed between the master cylinder 16 and the slave cylinder 18 of the individual brake assemblies 28, at least one low pressure accumulator 24, normally closed hold/dump valves 22 disposed between the slave cylinder 18 of the individual brake assemblies 28 and the low pressure accumulator 24, and a hydraulic pump 26 connected between the low pressure accumulator 24 and the inlet to the isolation valves 20. The control unit 12 may also include an attenuator 27 between the output of the hydraulic pump 26 and the inlet to the isolation valve 20 to limit and smooth fluid flow from the output of the pump 26 back to the master cylinder 16.

During normal braking in the absence of wheel lock-up, the operator of the vehicle depresses the brake pedal 14 causing the master brake cylinder 16 to provide pressurized brake fluid to the brake slave cylinder 18 of the brake assemblies 28 through the normally open isolation valves 20, thereby providing operator controlled braking of the associated wheels (not illustrated).

When a wheel lock-up condition of one or all of the wheels is sensed by an anti-lock electronic brake control sensor (not illustrated), the normally open isolation valves 20 of associated wheels experiencing lock-up conditions are closed to prevent a further increase of the brake fluid pressure being applied to the slave cylinders 18 of the associated wheels. If the lock-up condition of an associated wheel continues, the associated normally closed hold/dump valve 22 is opened as needed, to relieve the pressure of the brake fluid being applied to the slave cylinder 18. The opening of the hold/dump valve 22 allows a predetermined quantity of brake fluid to flow from the slave cylinder 18 into a low pressure accumulator 24. The hydraulic pump 26 pumps the fluid temporarily dumped into the low pressure accumulator 24 back to the inlet side of the isolation valve 20 to maintain the pressure of the brake fluid in the low pressure accumulator 24 at a value less than the pressure being applied to the slave cylinder 18, so that each time the hold/dump valve 22 is opened it will always result in decreasing the pressure being applied to the slave cylinder 18.

Upon the detection of the lock-up condition being terminated, the associated hold/dump valve 22 is closed and the isolation valve 20 is reopened, as needed, to increase the brake fluid pressure being applied to the slave cylinder 18, again maximizing the braking torque applied to the associated wheel.

Figure 2:
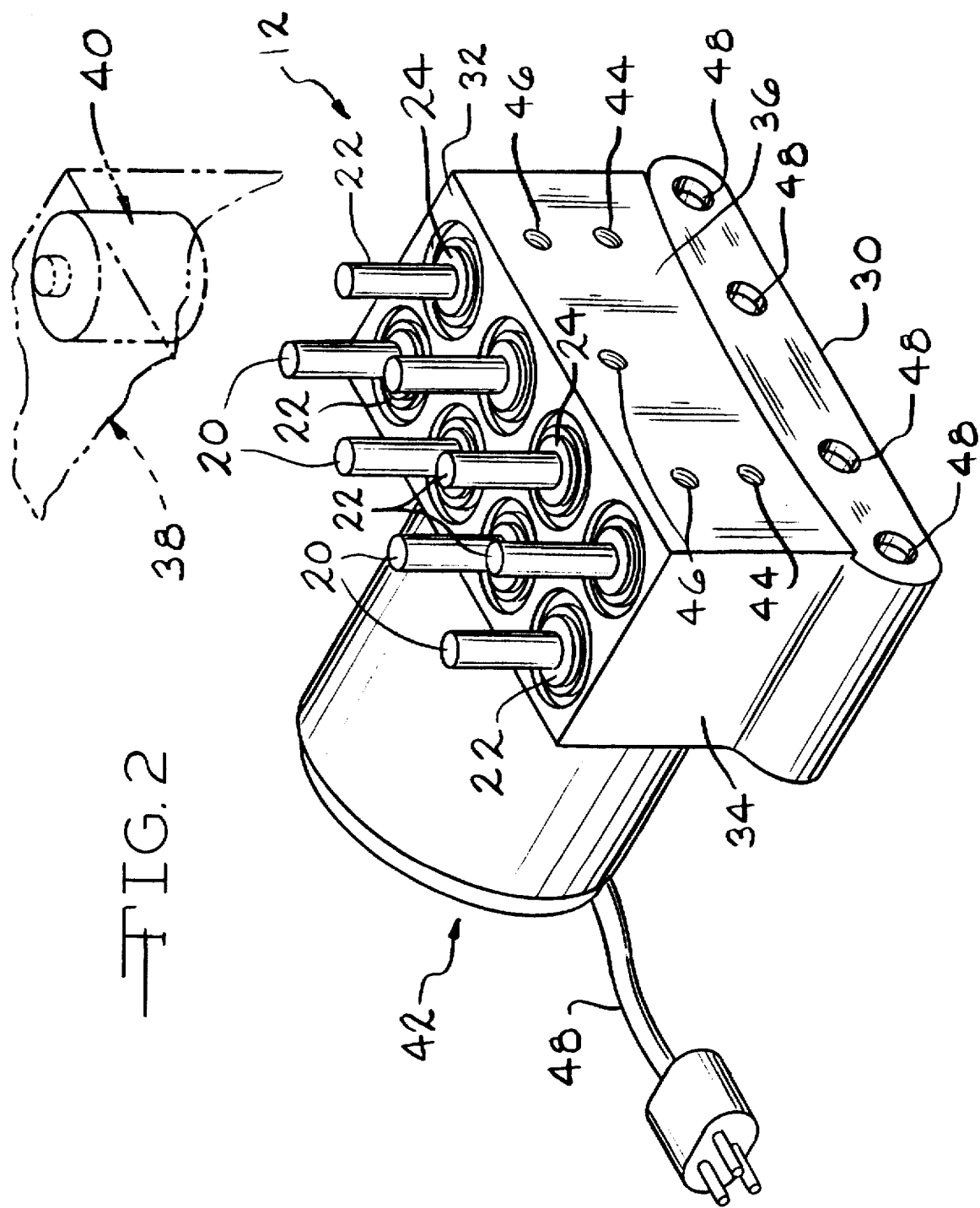
FIG. 2 is a perspective view of an anti-lock hydraulic valve control unit according to the present invention.

The construction of the hydraulic control unit 12 is illustrated in FIG. 2. The control unit 12 consists of a valve body housing 30 having at least wall surfaces 32, 34, and 36 and a coil integrated module (CIM) 38 securable to the valve body housing 30 in final assembly. The valve body housing 30 is preferably made from aluminum but may be made from any other metal or alloy having the desired swaging properties as shall be explained hereinafter. For clarity of illustration, only a portion of the coil integrated module 38 is shown in FIG. 2. The coil integrated module 38 contains a solenoid coil assembly 40 for each of the isolation valves 20 and hold/dump valves 22 required by the anti-lock brake system.

Extending from the wall of the valve body housing 30 opposite the wall surface 36 is an electric motor 42 driving the hydraulic pump 26 enclosed within the valve body housing 30. The electrically driven hydraulic pump 26 pumps the brake fluid from the low pressure accumulator 24, as previously described relative to FIG. 1, to maintain the pressure in the low pressure accumulator 24 below the brake fluid pressure being applied to the slave cylinder 18. Mounted within the valve body housing 30 are a requisite number of isolation valves 20 and hold/dump valves 22. External portions of the valves 20 and 22 which contain an armature (not illustrated in FIG. 2) extend from the wall surface 32. Each external portion is circumscribed by a selected one of the solenoid coil assemblies 40 (only one of which is illustrated in FIG. 2) in the coil integrated module 38. In the preferred embodiment, an individual isolation valve 20 and an individual hold/dump valve 22 is provided in the valve body housing 30 for each wheel of the vehicle to control the brake fluid pressure being applied to the associated slave cylinder 18.

However, in other types of braking systems, such as a crossed diagonal braking system, only a single isolation valve 20 and a single hold/dump valve 22 may be used to control the brake fluid pressure being applied to the slave cylinders 18 for each diagonally opposite pair of wheels. This reduces the number of isolation valves 20 and dump/hold valves 22 in the control unit 12 to two (2) each.

Also, in a vertical split braking system, the rear wheels are activated as a pair and only a single isolation valve 20 and single hold/dump valve 22 are used to control the rear wheels in an anti-lock mode of operation.

Returning to embodiment illustrated in FIG. 2, each isolation valve 20 and hold/dump valve 22 associated with a particular wheel are aligned with each other. For example, the isolation and hold/dump valves are aligned with each other perpendicular to the wall surface 36 of the valve body housing 30.

Provided in wall surface 36 of the valve body housing 30 are a pair of threaded apertures 44 which are adapted to receive threaded connectors provided on the end of the hydraulic lines (not shown) which connect the valve body housing 30 to the master cylinder 16. Also provided in wall surface 36 are four threaded apertures 46 which are adapted to receive threaded connectors on the end of the hydraulic lines (not shown) connecting the valve body housing 30 to the individual slave cylinders 18 associated with the brake assemblies of each wheel. The end caps 48 formed in wall surface 36 enclose one end of four low pressure accumulators 24 (not illustrated in FIG. 2) embodied in the valve body housing 30 and two attenuators 27 (not illustrated in FIG. 2). The end caps 48 may be threaded into the valve housing 30 or swaged in place as shall be discussed hereinafter. Likewise, threaded apertures 44 and 46 may be eliminated in favor of a threadless-type connector, including swaging.

Figure 3:
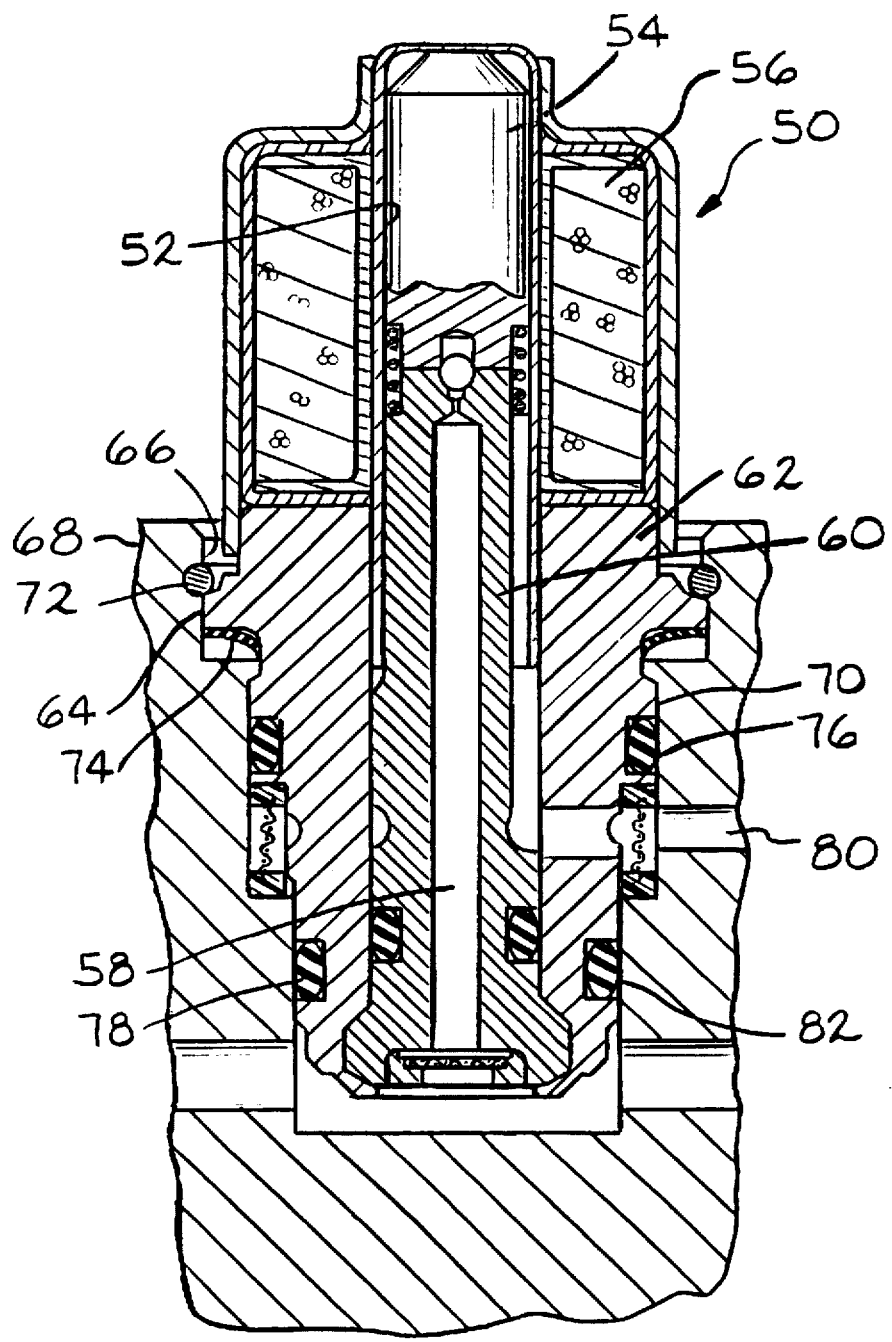
FIG. 3 is a sectional view of a prior art isolation valve for an anti-lock brake system.

FIG. 3 illustrates a sectional view of a prior art isolation valve 50 mounted in a hydraulic control unit such as taught by Linkner, Jr. in U.S. Pat. No. 5,364,067. As is obvious to one skilled in the art, the structure shown in FIG. 3 is equally applicable to hold/dump valves. The prior art isolation valve 50 has a cylindrical sleeve 52 in which a movable armature 54 is slidably received. An annular coil 56 circumscribes the sleeve 52. The armature 54 has a ball valve which engages a valve seat located at one end of a coaxial fluid passage 58 provided through a valve stem 60. The armature 54 is biased away from the valve stem 60 by a spring as shown. The valve stem 60 is locked in a valve body 62 which has a radial flange 64 received through an opening 66 provided in the valve body housing 68. The valve body housing 68 has a valve cavity 70 having an annular recess in which a snap ring 72 is received to inhibit the removal of the valve body 62 from the valve cavity 70. An annular wave washer 74 biases the radial flange 64 against the snap ring 72 to lock the valve body 62 in the valve cavity 70.

Annular fluid seals 76 and 78 are disposed in annular grooves formed in the valve body 62 on opposite sides of an internal passageway 80 provided in the valve body housing 68 which serves as an outlet port while a fluid seal 82 is provided between the valve stem 60 and the valve body 62. As can be seen, the valve cavity 70 has several counterbores and an annular recess which increases the complexity and cost of the machining of both the valve cavity 70 and the valve body 62. Additionally, the assembly of the valve 50 into the valve bore requires two annular seals 76 and 78, a snap ring 72, and a wave washer 74 which increases the assembly complexity, assembly time and cost of the anti-lock braking hydraulic control unit. In addition to the isolation valve 50, the hydraulic control unit may also embody a hold/dump valve, a low pressure accumulator, a pump, and an attenuator in a well known manner.

Figure 4:
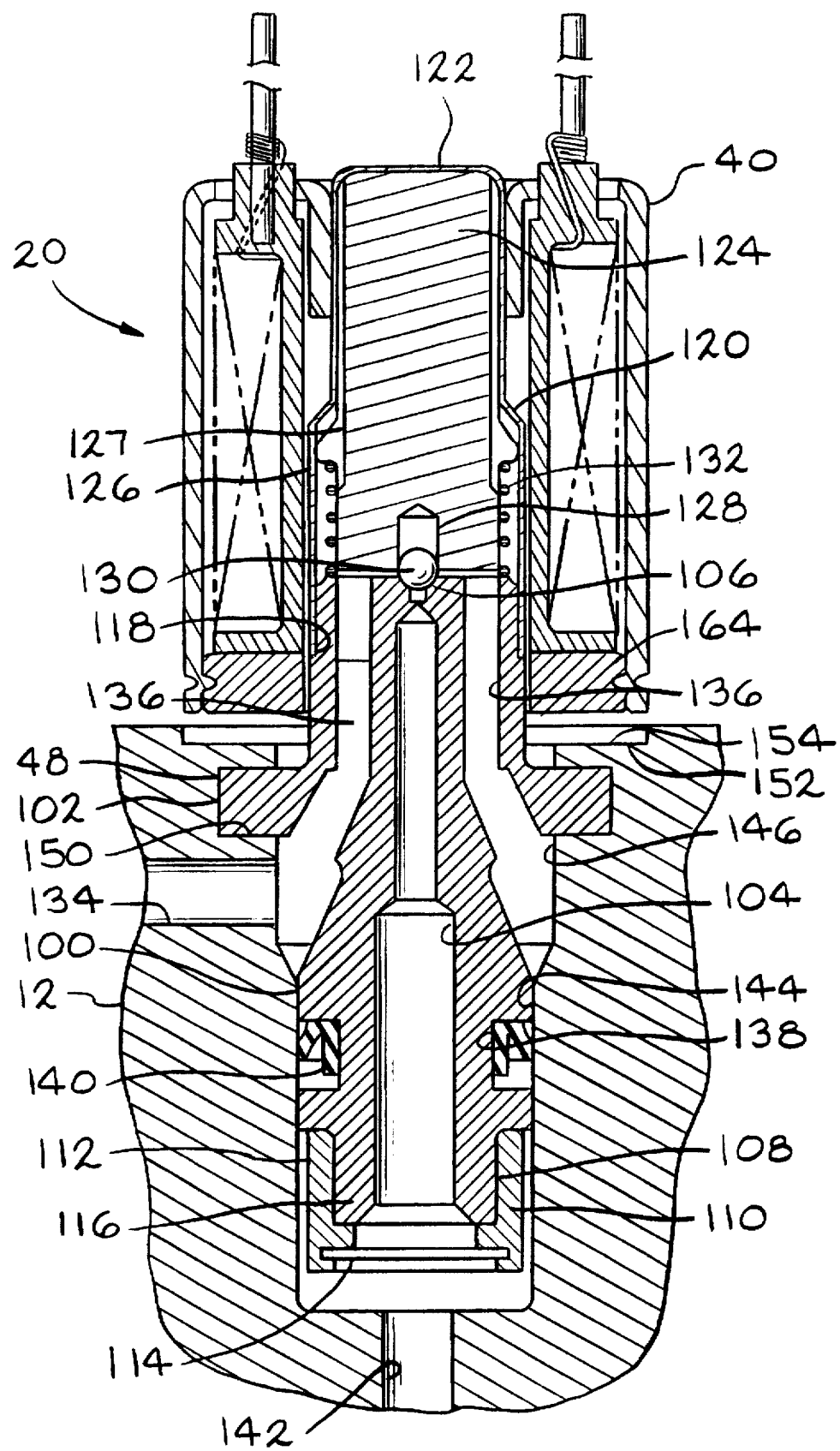
FIG. 4 is a sectional view of an isolation valve according to the present invention.
Figure 7:
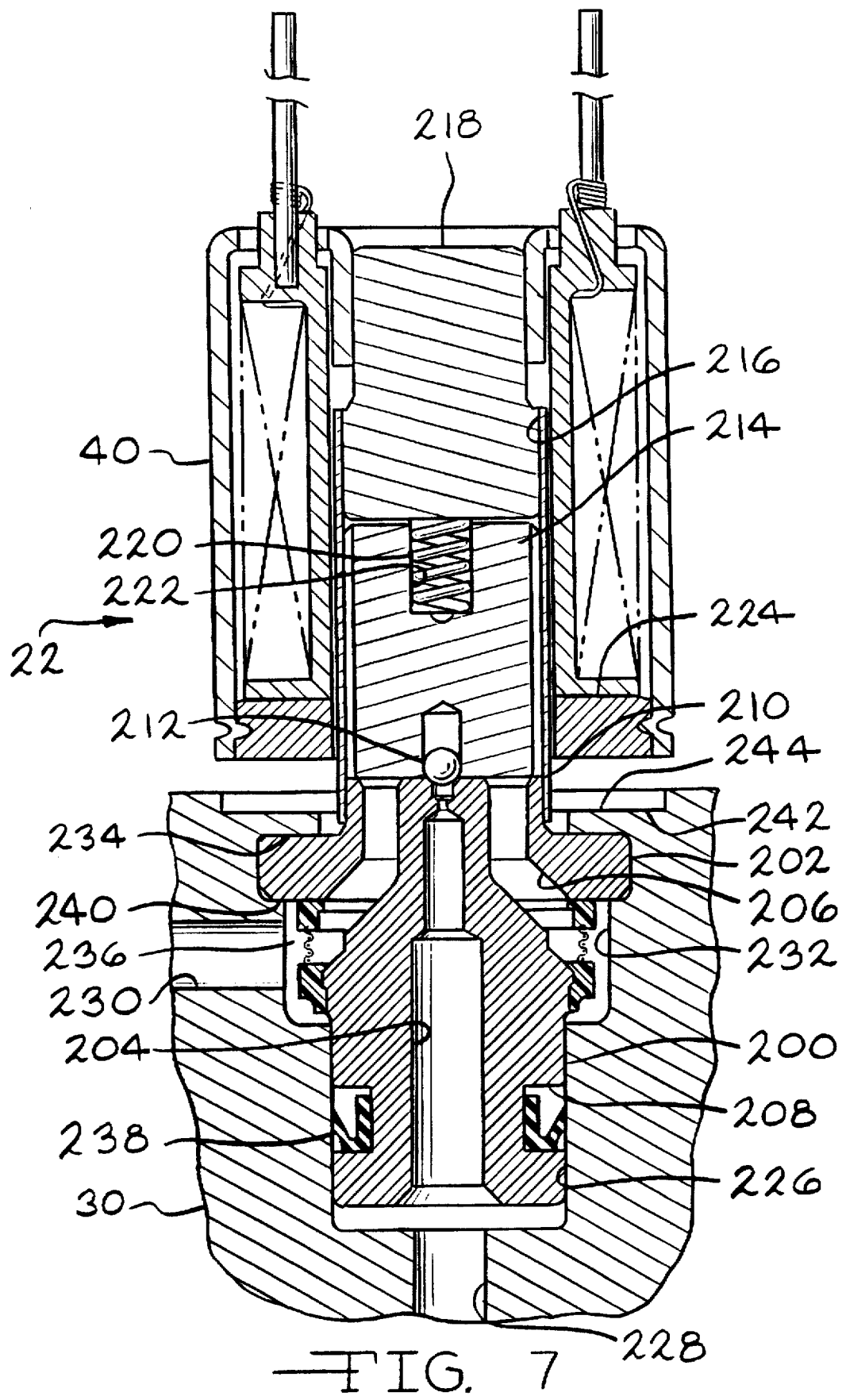
FIG. 7 is a sectional view of a hold/dump valve according to the present invention.

The construction of first preferred embodiments of the isolation valve 20 and a hold/dump valve 22 according to the present invention are illustrated in FIGS. 4, 5 and 7. The design of valves 20 and 22 result in a significant reduction in the machining and assembly operations of the valves themselves and the valve body housing 30. The structure of the isolation valve 20 and its assembly to the valve body housing 30 are shown in FIG. 4. The isolation valve 20 has a cylindrical valve body 100 having a radial flange 102. The valve body 100 has a coaxial flow passage 104 provided therethrough which terminates at its upper end in a conical valve seat 106. The lower end of the valve body 100 has a reduced diameter portion 108 which has an annular catch 110 adjacent to its lower end. A filter assembly 112 having a filter 114 is received over the reduced diameter portion 108 of the valve body 100. The filter assembly 112 has an internal recess 116 in which the annular catch 110 is received to snap lock the filter assembly 112 to the end of the valve body 100 so that the filter 114 covers the lower end of the coaxial flow passage 104.

A cylindrical sleeve 120 has an open lower end and an closed upper end 122. The open end is laser welded to the valve body 100 providing a fluid tight seal therebetween. The valve body 100 has a reduced diameter section 118 over which the open end of the sleeve 120 is received.

An armature 124 is slidably disposed in the sleeve 120. The armature 124 has an annular flange 126 and an axial bore 128 in which is received a valve member sized to engage the valve seat 106 and block the upper end of the coaxial flow passage 104. The valve member is preferably a ball 130. The ball 130 is substantially non-deformable, for example, a steel ball. A coil spring 132 is disposed between the upper end of the valve body 100 and the flange 126 and resiliently biases the armature 124 away from the valve body 100 and the ball 130 away from the valve seat 106. As indicated, the armature 124 and the flange 126 have trough slots 127 providing a fluid passageway between the flange 126 and the closed end 122 of the cylindrical sleeve 100. The slots 127 prevent a fluid lock-up condition inhibiting the rapid displacement of the armature 124 relative to the valve body 100.

A coil assembly such as coil assembly 40 shown in FIG. 2 is sidably received over the cylindrical sleeve 120 with a flux ring 164 being in close fitting, sliding engagement with valve body section 118. Optionally, to accommodate manufacturing tolerances, a slight clearance can be allowed between the flux ring 164 and sleeve 120. The coil assembly 40 is operative, when energized, to produce a magnetic field displacing the armature 124 towards the valve body 100 causing the ball 130 to seat on the valve seat 106. The seating of the ball 130 on the valve seat 106 terminates the fluid flow between the axial fluid inlet passage 104 and an outlet passageway 134 formed in the valve body housing 30 through internal passageways 136 formed in the valve body 100. The outlet fluid passageway 134 is connected to an associated threaded aperture 46 and to the input of the associated hold/dump valve 22 as shown in FIG. 1.

As stated above, the coil assembly 40 includes an annular flux ring 164 disposed at the end adjacent the valve body housing 30. The flux ring 164, such as taught in patent application Ser. No. 08/198,365, assigned to the assignee of the present invention, issuing as U.S. Pat. No. 5,439,279 on Aug. 8, 1995, the disclosure of which is hereby referenced as a further teaching of the subject matter, enhances the strength of the magnetic field acting on the armature 124 and reduces the current required to produce a magnetic field having a strength sufficient to displace the armature 124 against the force of spring 132.

The valve body 100 further has an annular groove 138 in which is received a one-way seal 140 to prevent a fluid flow from the internal inlet passageway 142 of the valve body housing 30 to the outlet passageway 134. The internal inlet passageway 142 connects to an associated threaded aperture 44, FIG. 2, and to the master brake cylinder 16 and to the output of the pump 16 as shown in FIG. 1.

The valve body housing 30 has a valve cavity 144 for each isolation valve 20 and each hold/dump valve 22 to be mounted therein. The lower or bottom end of the valve cavity 144 has an annular recess 146 provided adjacent to the terminal ends of internal passageways 138 and a counterbore 148 which receives the radial flange 102. Preferably, the diameter of the counterbore 148 is slightly smaller than the diameter of the radial flange 102, typically about 0.05 to 0.15 mm (0.002 to 0.006 in.), producing an interference fit in the radial sealing area of the radial flange 102. The depth of the counterbore 148 is typically about 2.0 mm greater than the thickness of the radial flange 102 so that when the isolation valve 20 is inserted into the valve cavity, the upper surface of the radial flange 102 is approximately 2.0 mm below the adjacent surface of the valve body housing. The diameter of the counter bore 148, however, may be slightly larger than the diameter of the radial flange 102 so that it is not necessary to press the radial flange 102 into the counterbore during assembly. However, such an arrangement would require an additional fluid seal, for example an "O-ring" seal at the underside of flange 102, to augment loss of the fluid seal provided by the press fit radial flange embodiment.

Figure 5A:
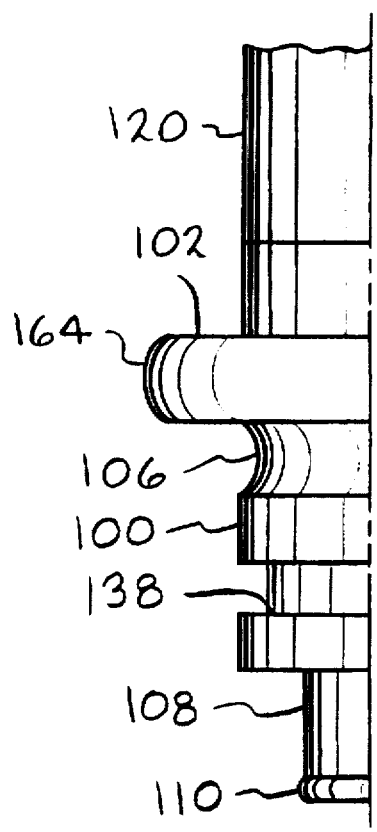
FIG. 5A is an enlarged elevation view of a right half of the valve body of FIG. 4 removed from a hydraulic control unit, wherein a seal and a filter assembly have been removed from the valve body and details of a radial flange are shown.

To facilitate the press fit insertion of the radial flange 102 into the counterbore 148, a portion 156 of the radial flange 102 is tapered at approximately 15° to form a truncated cone as shown in FIG. 5A. This truncated cone permits the radial flange 102 to be properly centered into the counterbore 148, and it reduces the insertion forces required to seat the radial flange 102 on the shoulder 150 formed at the bottom of the counterbore 148 when the radial flange 102 is an interference fit. The upper edge of the radial flange 102 has a beveled edge 158 to increase the shear area and facilitate the sealing of the radial flange 102 in the counterbore 148 as shall be explained hereinafter.

Figure 5B:
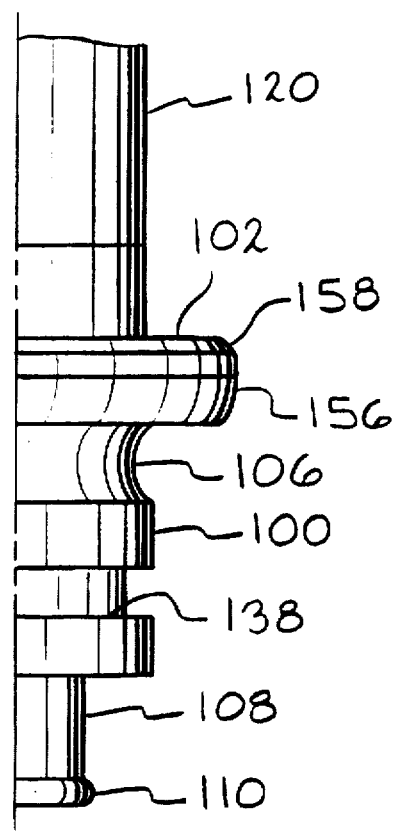
FIG. 5B is a view similar to FIG. 5A illustrating an alternate spherically-shaped surface on the radial flange.

The truncated cone portion 156 is also used to form an interference fit for either primary or secondary fluid pressure sealing. When used for pressure sealing, the shallow 15 degree angle causes any debris, that might be generated at this interference seal area, to be subducted (squeezed into a portion 102 of the interference seal area) rather than be plowed ahead. Alternatively, the truncated cone portion 156 could be replaced by a spherically-shaped surface 164 as shown in FIG. 5B to provide the same centering, sealing, and subducting features.

After the radial flange 102 is seated on the shoulder 150 as shown on the left side of FIG. 4, the region 152 of the valve body housing 30 adjacent to the edge of the counterbore 148 is swaged to a depth from 0.4 to 0.8 mm to form a lip 154 over the upper surface of the radial flange 102. The preferred depth of the swaged area is 0.6 mm. The beveled surface 158 facilitates the flow of the metal of the valve body housing 30 over the radial flange 102 during the swaging process. The swaged lip 154 locks the valve body 100 in the valve bore 144 of the valve body housing 30 and produces an excellent fluid tight seal between the outer edge of the radial flange and the valve body housing 30.

Figure 6:
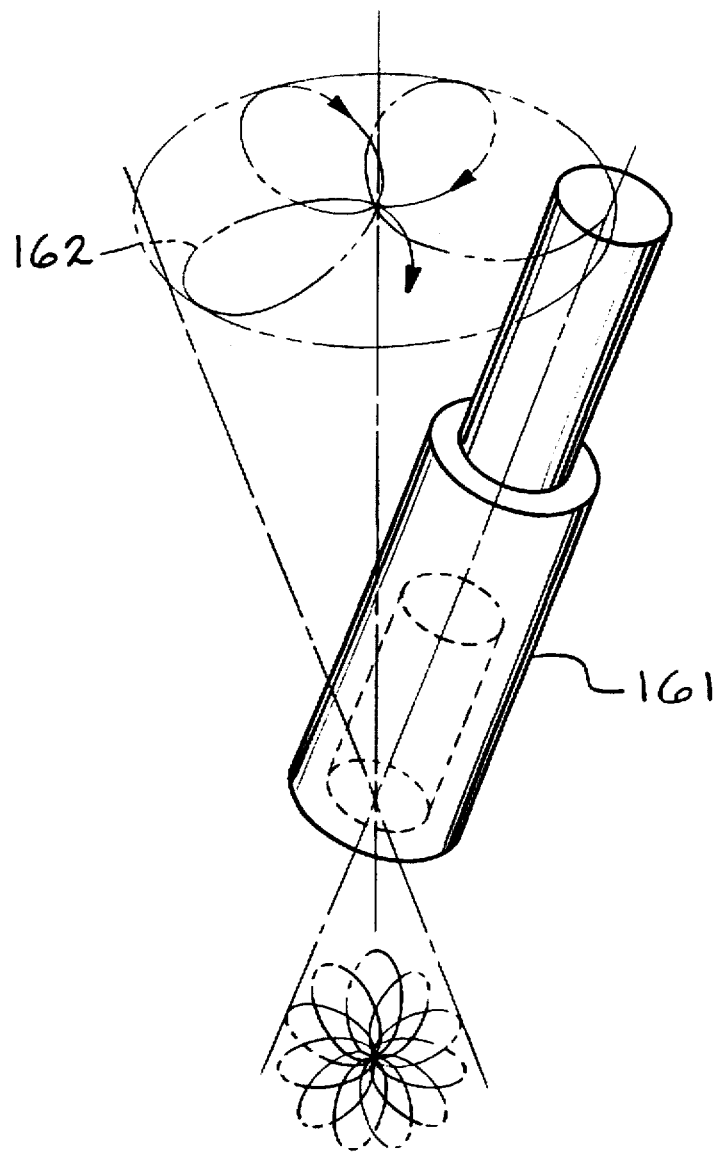
FIG. 6 is a schematic representation of the orbital motion of a swaging tool in a rosette pattern.

Preferably, the lip 154 is swaged using a swaging tool 161 orbited in a rosette pattern 162 as shown in FIG. 6. The movement of the swaging tool 161 in the rosette pattern uniformly swages the lip 154 inwardly over the radial flange 102 as shown in FIG. 4. Preferably, the outer diameter of the swaging tool 161 is 4.0 mm greater than the diameter of the counterbore 148 and the eccentricity of the center line of the swaging tool 161 is within 0.5 mm of the center line of the counterbore 148. This swaging process not only secures the valve body 100 in the valve cavity 144 but also produces an excellent fluid tight seal between the radial flange 102 and the valve body housing 30. During the swaging process, the advance speed of the swaging tool 161 is preferably between 2.0 to 2.8 mm/sec.

Alternatively, the annular lip 154 could be formed with the same swaging tool orbited in a concentric circular orbital pattern rather than in the rosette pattern. This, however, would require higher loading to form the annular lip 154 but would produce lower vibrations.

This same type of swaging process may be used to swage the end caps 48 enclosing the low pressure accumulators and the attenuators in the valve body housing 30, as shown in FIG. 1.

The construction of the hold/dump valve 22 is illustrated in FIG. 7. Hold/dump valve 22 as shown substantially embodies the subject matter of the present invention as discussed above relative to the isolation valve 20 of FIG. 4. The hold/dump valve 22 has a generally cylindrical valve body 200 having a radial flange 202, a coaxial outlet passage 204, an inlet passage 206 and an annular seal groove 208. The coaxial outlet passage 204 has a conical valve seat 210 provided at its upper end which is sealingly engaged by a ball valve 212 attached to an armature 214. The ball 212 is a substantially non-deformable steel ball.

The armature 214 is slidably received in a cylindrical sleeve 216 sealed at one end to the valve body 200 and sealed at the other end to a cylindrically-shaped stationary pole piece 218. In the preferred embodiment, the sleeve 218 is laser welded to the valve body 200 and the pole piece 218 forming a fluid tight seal therebetween. A coil spring 220 received in a spring bore 222 provided in the armature 214 resiliently biases the armature 214 away from pole piece 218 and biases the ball 212 to engage the valve seat 210, thus providing the hold/dump valve 22 with a normally closed state. As would be obvious to those skilled in the art, the spring bore 222 may alternatively be provided in the pole piece 218.

A solenoid coil assembly, such as solenoid coil assembly 40 shown in FIG. 2, is slidably received over the pole piece 218 and the sleeve 216, with the flux ring 164 being in close fitting, sliding engagement with the sleeve 216. Optionally, a slight clearance could be allowed between flux ring 224 and sleeve 216. Coil assembly 40 is operative, when energized, to generate a magnetic field displacing the armature 214 in a direction towards the pole piece 218 disengaging the ball valve 212 from the conical valve seat 210 thus opening a fluid passage from the inlet passage 206 and the coaxial passage 204. As described above, the coil assembly 40 includes an annular flux ring 164 to enhance the strength of the magnetic field in the vicinity of the armature 214.

The valve cavity 226 provided in the valve body housing 30 has a generally cylindrical shape. The valve body housing 30 further has at least an internal outlet passageway 228, an inlet passageway 230, an annular recess 232 adjacent to the terminal ends of the inlet passageways 206, and a counterbore 234. The counterbore 234, is sized to receive the radial flange 202 with a loose fit or an interference fit with the rim of the radial flange 202. Likewise, similar to the radial flange 156 of the isolation valve 20 illustrated in FIG. 5A, the rim of the radial flange 202 preferably has a truncated conical surface corresponding to truncated conical surface 156 and a beveled edge corresponding to the beveled edge 158. The truncated conical surface facilitates the centering of the radial flange 202 in the counterbore 234 and also reduces the force required to insert the valve body 200 into the valve cavity 226 when the counterbore 234 is sized to be an interference fit with the flange 202. An annular filter 236 is received over the valve body 200 with the same snap-fit construction previously described and covers the terminal ends of the inlet passages 206 and a one-way seal 238 is disposed in the annular seal recess 208 to prevent a fluid flow from the inlet port 232 to the outlet port 228.

After the radial flange 202 is properly seated on the shoulder 240 formed at the bottom of the counterbore 234, the region 242 of the valve body housing 30 adjacent to the counterbore 234 is swaged to form an annular lip 244 which secures the radial flange 202 to the valve body housing 30. Preferably, the region 242 is swaged using a swaging tool, such as swaging tool 161 shown on FIG. 6, orbited about the edge of the counterbore in a rosette pattern 162 to form the lip 244.

As discussed above relative to the isolation valve 20 shown on FIG. 4, the swaged lip 244 not only secures the valve body 200 to the valve body housing 30 but also may, because of the press fit between the flange 202 and the wall of the counterbore 234, form an excellent primary fluid seal prohibiting the pressurized brake fluid received through the inlet passageway 230 from leaking past the radial flange without the need for a separate O-ring seal at this interface.

The use of a separate flux ring 164 as part of the coil assembly 40 facilitates downsizing of the valves and thus the valve body bores. Further, it facilitates the swaging or other non-threaded connection of the isolation and hold/dump valves to the valve body housing 30 which, in turn, permits even further downsizing of the valves, other components and valve body overall.

The valve body housing 30 as previously described, will have internally provided therein, the requisite fluid passageways 142 connecting the threaded ports 44 to the isolation valves 20, fluid passageways 132, 230 connecting the outlet ports of the isolation valves 20 to the threaded outlet ports 46 and to the associated hold/dump valves 22, internal fluid passageways 228 connecting the outlet ports of the hold/dump valves 22 to the low pressure accumulators 24, internal passageways connecting the low pressure accumulators 24 to the pump 26, and internal passageways connecting the outlet of the pump 26 to the attenuator 27 and back to the input of the isolation valves 20 as shown in FIG. 1. The valve body housing 30 will also house the moving components of the hydraulic pump 26, the component parts of the low pressure accumulator 24 and the components of the attenuator as is known in the art.

Valves 20 and 22 mounted in the valve body housing 30 constitute a hydraulic control unit 12 which may be characterized as a "throwaway" modular control unit. If a valve 20 or 22 did not deliver desired results, the control unit 12 can be discarded rather than repaired since the assembly of the valve 20 or 22 is accomplished by swaging, rather than by a valve body threaded into a bore as disclosed in U.S. Pat. No. 4,828,335.

Figure 8:
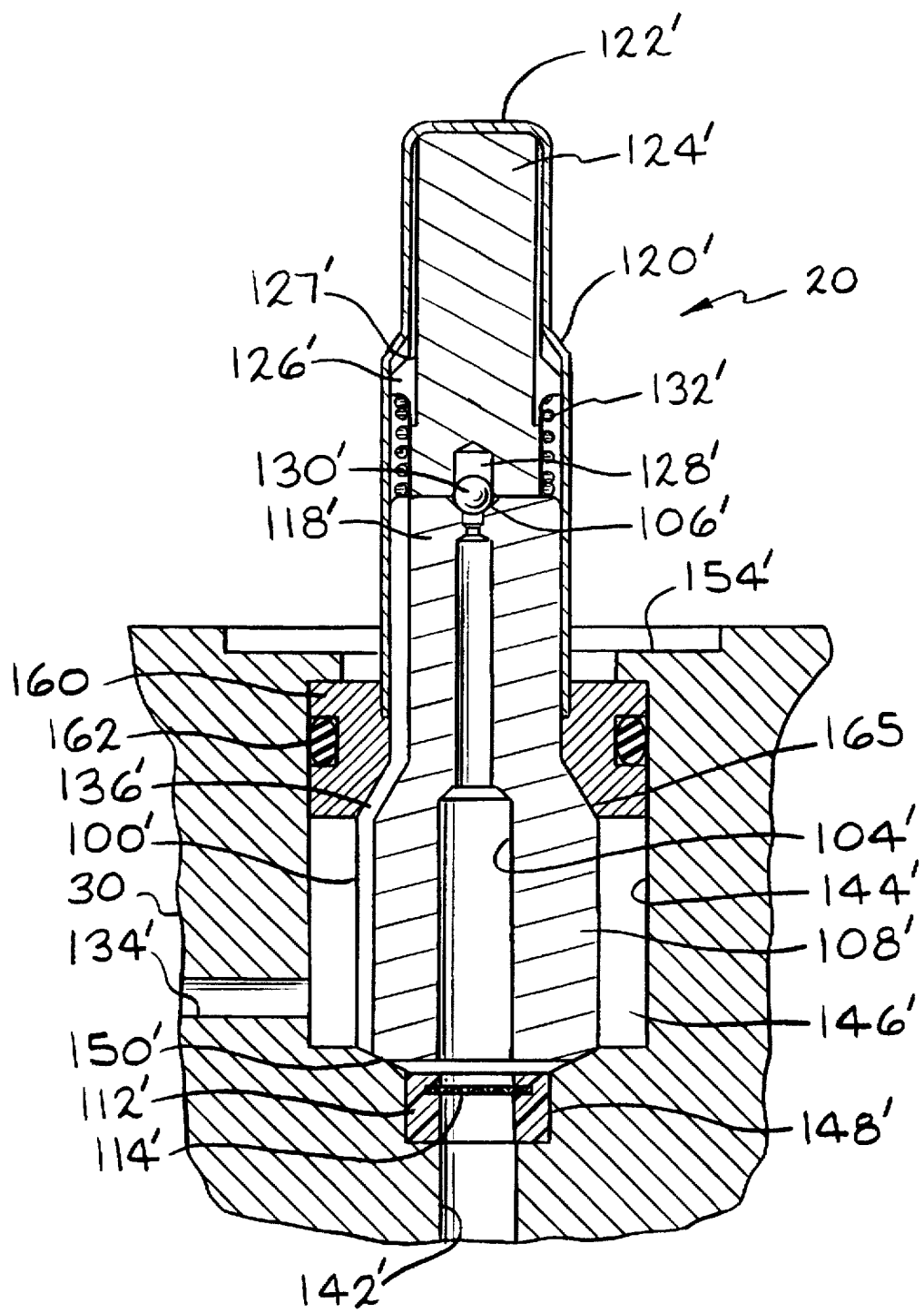
FIG. 8 is a sectional view of a second embodiment of an isolation valve according to the present invention.

A second preferred embodiment of an isolation valve 20' according to this invention and its assembly to the valve body housing 30 is illustrated in FIG. 8. In comparison with the embodiment of FIG. 4, like reference numerals followed by a prime symbol (') are used to indicate the similar or identical features common to both embodiments. The isolation valve 20' has a cylindrical valve body 100'. The valve body 100' has a coaxial flow passage 104' provided therethrough which terminates at its upper end in a conical valve seat 106'. The lower end of the valve body 100' has an enlarged diameter portion 108'. A filter assembly 112' having a filter 114' is received within a counterbored portion of the valve body 100' adjacent inlet passageway 142'. A cylindrical sleeve 120' has an open end and a closed end 122'. The open end is laser welded to an annular retainer ring or collar 160 described below, providing a fluid tight seal therebetween. The valve body 100' has a reduced diameter section 118' over which the open end of the cylindrical sleeve 120' and retainer ring 160 are received. A passageway 136' (only one of which is shown) is in the form of an external trough slot, thereby allowing it to be milled at the outer surface of the valve body 100'. Preferably two or more such passageways 136' will be provided.

An armature 124' is slidably disposed in the cylindrical sleeve 120'. The armature 124' includes an annular flange 126' and an axial bore 128' in which is received a valve member sized to engage the valve seat 106' and block the upper end of the coaxial flow passage 104'. The valve member is preferably a ball 130'. The ball 130' may be a steel ball but preferably is a substantially non-deformable ceramic ball as described earlier. A coil spring 132' is disposed between the upper end of the valve body 100' and the flange 126' and resiliently biases the armature 124' away from the valve body 100', thereby allowing the ball 130' to move away from the valve seat 106'. As stated above, the armature 124' and the flange 126' have trough slots 127' providing a fluid passageway between the flange 126' and the closed end 122' of the cylindrical sleeve 120'. The slots 127' prevent a fluid lock-up condition inhibiting the rapid displacement of the armature 124' relative to the valve body 100'.

A coil assembly (not illustrated) such as previously described coil assembly 40 in FIG. 4 is received over the cylindrical sleeve 120' and is operative, when energized, to produce a magnetic field displacing the armature 124' towards the valve body 100' causing the ball 130' to seat on the valve seat 106'. The seating of the ball 130' on the valve seat 106' terminates the fluid flow between the axial fluid passage 104' and an outlet passageway 134' formed in the valve body housing 30 through the passageways 136' in the valve body 100'. The outlet fluid passageway 134' is connected to an associated threaded aperture 46 and to the input of the associated hold/dump valve 22.

The internal inlet passageway 142' connects to an associated threaded aperture 46, the master cylinder 16, and the output of the pump 26 as shown in FIG. 1.

The valve body housing 30 has a valve cavity 144' for each isolation valve 20' and each hold/dump valve 22 to be mounted therein. The lower or bottom end of the valve cavity 144' has an annular recess 146' provided adjacent to the terminal ends of internal passageways 136' and a counterbore 148' leading into inlet 142'. The counterbore 148' provides a tapered shoulder 150' which provides a stop for the valve body 100'.

The retainer ring 160 with attached sleeve 120' is slidably received over the reduced diameter section 118' of the valve body 100'. The ring 160 includes a compression seal member 162, such as an O-ring, within an annular groove to preclude fluid escaping externally of the cavity 144'. The retainer ring 160 also includes an interior curvilinear, radiused surface 165 mating with an adjacent complementary surface or shoulder on the valve body 100', preferably in the form of a truncated conical surface, providing a secondary fluid seal at this interface during the assembly process described below, as well as serving to hold the valve body 100' on shoulder 150'. Further, at its other end, the internal bore of the retainer ring 160 is counterbored to receive the open end of sleeve 120' prior to being laser welded thereto. Thus, the internal diameter of the sleeve 120' and minimum diameter of the retainer ring 160 are the same and sized to provide a sliding fit with valve portion 118'.

After the valve body 100' is seated on the shoulder 150' and the retainer ring and sleeve assembly 160, 120 is in place an annular lip 154' of the valve body housing 30 adjacent to the edge of the bore 144' is swaged to form a valve retention lip 154' over the upper surface of the retainer ring 160. The swaged lip 154' locks the valve body 100' in the valve bore 144' of the valve body housing 30 and produces an excellent fluid tight seal at the shoulder 150', thereby precluding fluid flow from inlet passageway 142' to the outlet passageway 134'.

The annular lip 154' may be formed by initially machining an annular groove (not illustrated) in the valve body housing 30 concentric with bore 144'. During assembly, the lip 154' is preferably cone swaged using a swaging tool as taught in U.S. Pat. No. 5,364,067, assigned to the assignee of the present invention hereby referenced as a teaching of the process.

A hold/dump valve such as valve 22 shown in FIG. 7 could be constructed and retained in the valve body housing 30 by a retainer ring 160 in the same manner as valve 20' illustrated in FIG. 8.

Figure 9:
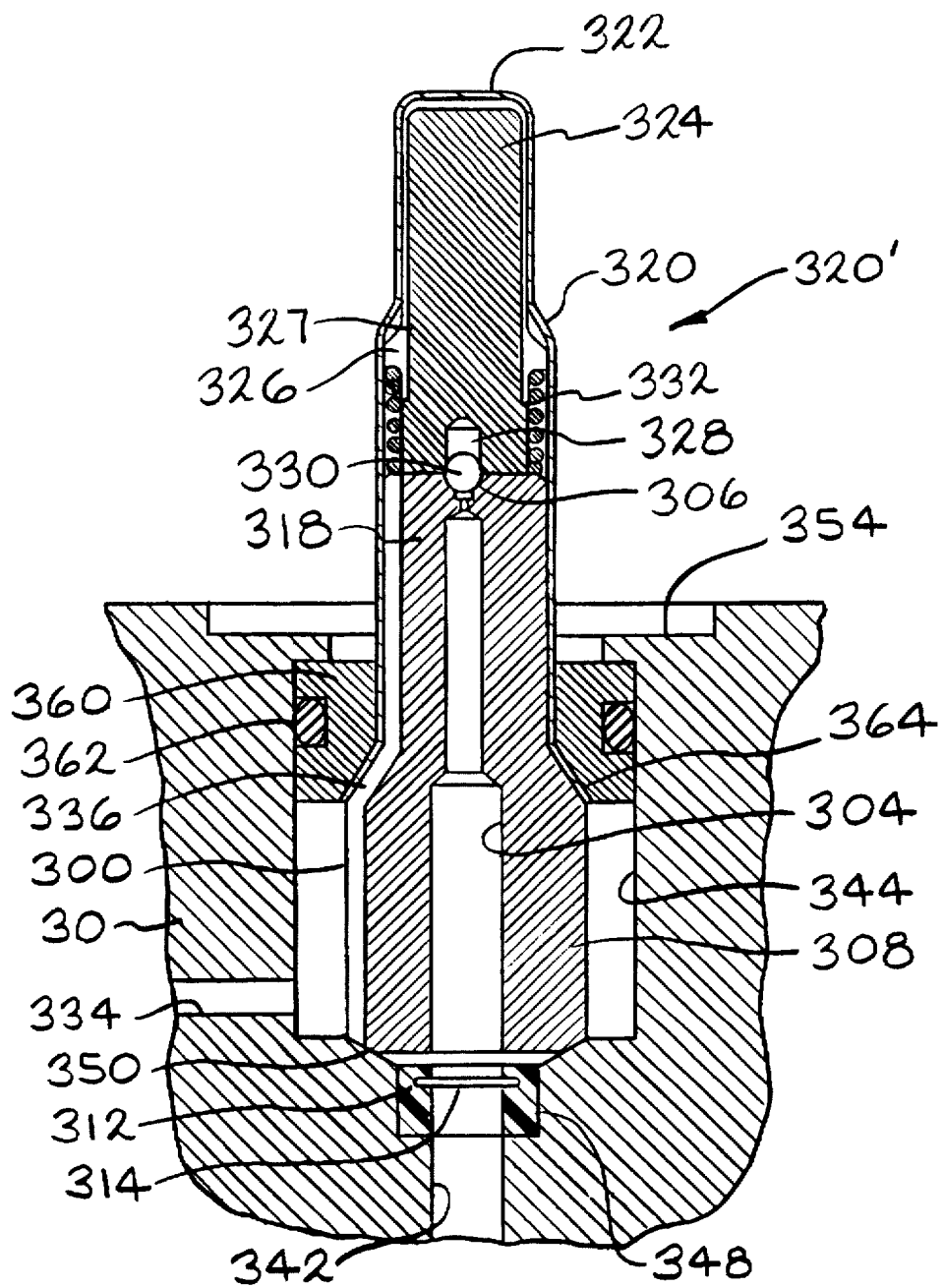
FIG. 9 is a sectional view of a third embodiment of an isolation valve according to the present invention.

A third preferred embodiment of an isolation valve 320' according to this invention and its assembly to the valve body housing 30 is illustrated in FIG. 9. Reference numerals in the 300 series are used for elements of isolation valve 320' corresponding to similar or identical elements present in isolation valve 20' illustrated in FIG. 8. The isolation valve 320' includes a valve body 300, a ball 306 and an armature 324. A sleeve 320 has a closed upper end 322 and open lower end. The lower end of the sleeve 320 extends downwardly between a retainer ring 360 and the valve body 300. Preferably, the sleeve 320 terminates in a beveled portion pressed onto a curvilinear section, preferably formed as a truncated cone, of the valve body 300 formed between a reduced diameter portion 318 and an enlarged diameter portion 308. By pressing the sleeve 320 onto the valve body 300, a weld is not required between the two elements.

After the valve body 300 with the sleeve 320 is inserted into a bore 344, the retaining ring 360 is slid over the sleeve 320 and fitted onto the valve body 300. An annular lip 354 is formed from the material adjacent the bore 344. The lip 354 can be formed by radial swaging, or preferably by cone swaging (not illustrated). If cone swaging is utilized, an annular groove can be formed in the valve body housing 30 prior to the swaging process.

It will be apparent to one skilled in the art that a hold/dump valve 22 can be formed with elements similar to the sleeve 320 and retainer ring 360 used in isolation valve 320'.

Figure 10:
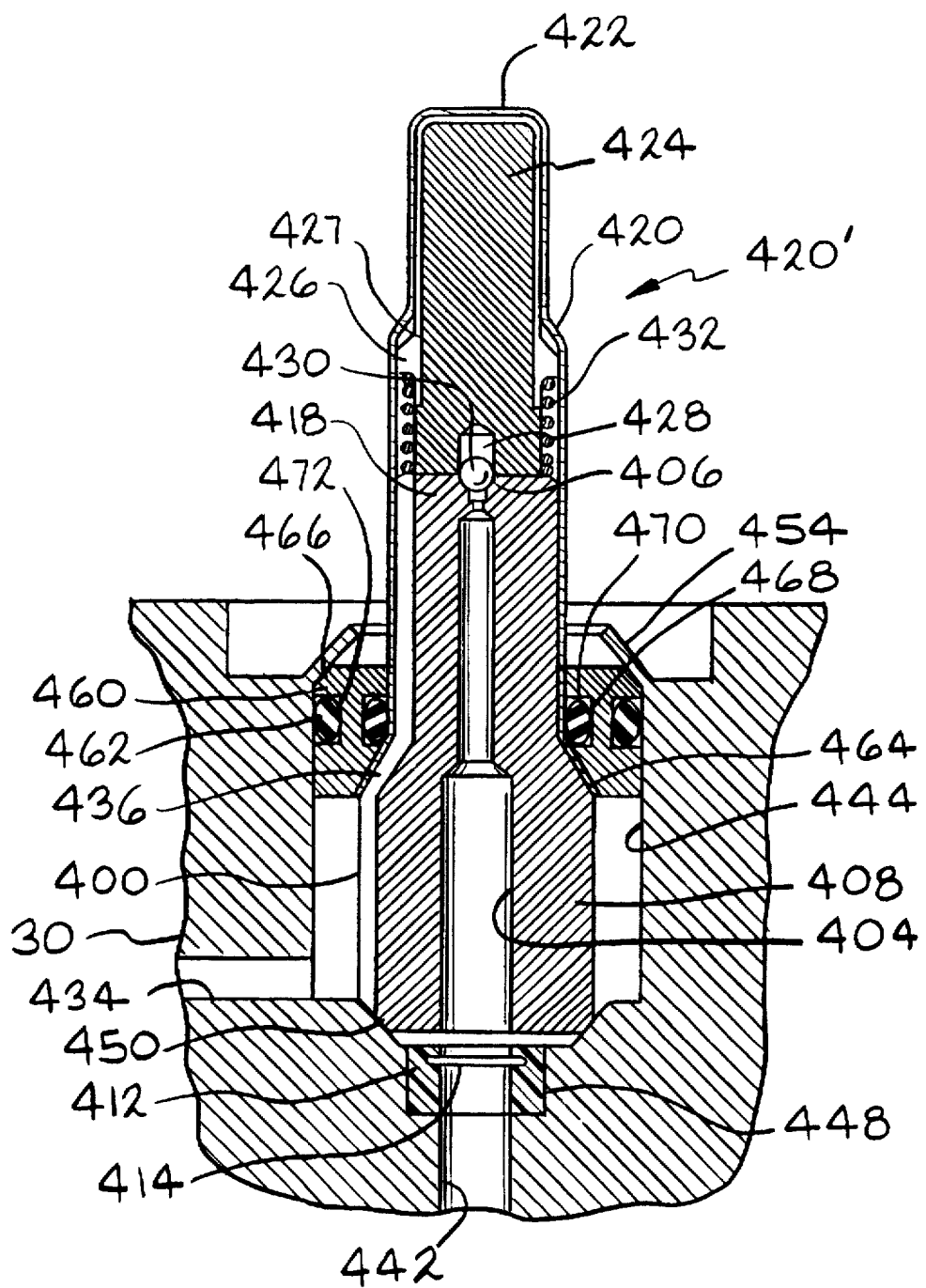
FIG. 10 is a sectional view of a fourth embodiment of an isolation valve according to the present invention.

A fourth preferred embodiment of an isolation valve 420' according to this invention and its assembly to the body housing 30 is illustrated in FIG. 10. Reference numerals in the 400 series are used for elements of isolation valve 420' corresponding to similar or identical elements in isolation valve 320' illustrated in FIG. 9. Isolation valve 420' includes a sleeve 420 terminating in a beveled portion trapped between a retainer ring 420 and a valve body 400. A bevel 466 is formed along the upper outer surface of the retainer ring 460 prior to the swaging process. An annular lip 454 is formed by a cone swaging process which presses against the bevel 466 to trap the retainer ring 460 and provide axial sealing. If desired, an annular groove can be formed in the inner surface of the bore of the retaining ring 460. A seal 470, illustrated as a compressible O-ring, can be received in the groove 468 to provide a seal between the retainer ring 460 and the sleeve 420. If desired, an annular groove 472 can be formed in the outer surface of the retaining ring 460. A seal 462, illustrated as a compressible O-ring, can be received in the groove 472 to provide a seal between the retainer ring 460 and the valve body housing 30.

An angled shoulder 450, preferably at 45 degrees or greater, is provided in the lower counterbore 448 of the valve body housing 30 to provide a relative small area of contact between the valve body housing 30 and the valve body 400. This small area provides a high sealing stress and seal seating.

Figure 11:
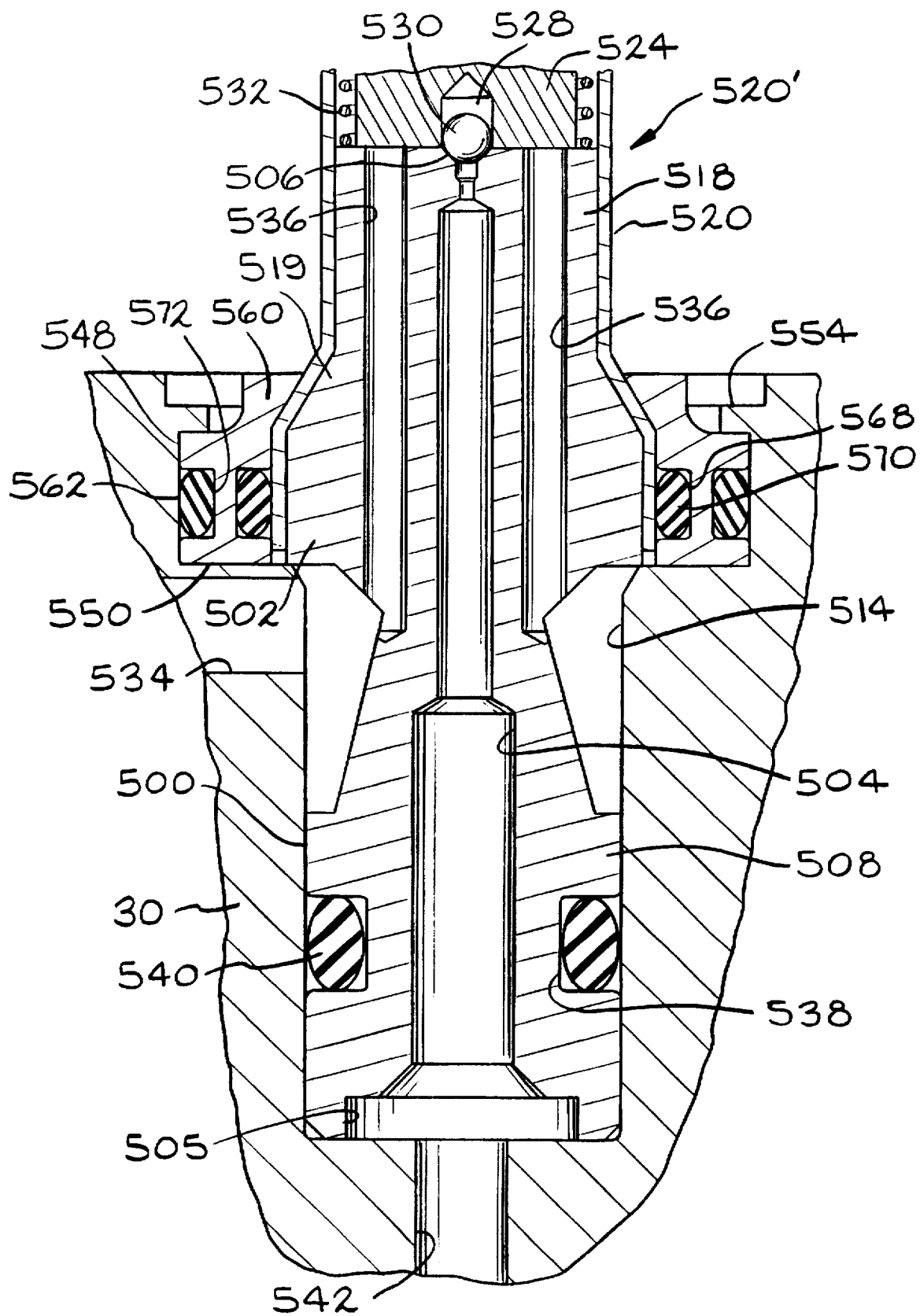
FIG. 11 is a sectional view of a fifth embodiment of an isolation valve according to the present invention.

A fifth preferred embodiment of an isolation valve 520' according to this invention and its assembly to the valve body housing 30 is illustrated in FIG. 11. The isolation valve 520' includes a generally cylindrical valve body 500. The valve body 500 includes a coaxial flow passage 504 provided therethrough which terminates at its upper end in a conical valve seat 506. The coaxial passageway 504 is in fluid communication with a fluid inlet 542 formed in the valve body housing 30. The lower end of the coaxial flow passage 504 may terminate in a counterbore 505. If desired, a fluid filter (not illustrated) can be adapted to lower end of the coaxial flow passage 504. For example, a filter assembly such as filter assembly 112 for valve body 100 of FIG. 4 can be adapted for the lower end of the valve body 500. In another illustrative example, a filter assembly such as filter assembly 112' and counterbore 148' for valve body 100' of FIG. 8 can be adapted for the valve body housing 30 of FIG. 11.

The valve body 500 includes a lower, enlarged diameter portion 508 and an upper, reduced diameter portion 518. A radial flange 502 is formed between the lower portion 508 and the upper portion 518. Preferably, a plurality of internal fluid passageways 536 are formed through the upper portion 518. The internal passageways 536 are in fluid communication with an outlet port 534 formed in the valve body housing 30.

An annular groove 538 is formed about the circumference of the lower portion 508. A seal 540, illustrated as a compressible O-ring seal, is received in the groove 538 to prevent the flow of fluid from the inlet port 542 to the outlet passageway 534.

The valve body housing 30 has a valve cavity 544 for each isolation valve 520' and each hold/dump valve. A counterbore 548 provides a stepped shoulder 550 which provides a stop for the radial flange 502.

A sleeve 520 has an open end which is fitted over the reduced diameter portion 518 of the valve body 500. The sleeve 520 houses a slidable armature 524 biased by a spring 532 and functions in a manner similar to armature 124 of FIG. 4. A coil assembly 40 (not illustrated in FIG. 11) is placed over the sleeve 520 and energized to slide the armature 524 toward from the valve body 500 so that ball 530 moves into the valve seat 506 as shown in FIG. 11 to block fluid to flow from the inlet passage 542 to the outlet passage 134.

Preferably, an angled shoulder 519 in the form of a truncated cone is formed on the outer circumference of the valve body 500 between the reduced diameter portion 518 and the radial flange 502. The lower end of the sleeve 520 is preferably fitted or pressed about the shoulder 519 so that an inner surface of the sleeve 520 is fitted against an outer surface of the flange 502 in a sealing manner. In this manner, the sleeve 520 does not have to be welded to the valve body 500.

A retainer ring or collar 560 is slid over the sleeve 520 and rests on the shoulder 550 of the valve body housing 30. Preferably, an inner surface of the retainer ring 560 is complementary to the outer surface of the sleeve 520. An annular groove 572 is formed in an outer surface of the retainer ring 560. A seal 562, illustrated as a compressible O-ring seal, is fitted in the groove 572 and provides a fluid seal between the valve body housing 30 and the retainer ring 560. A second annular groove 568 is formed in an inner surface of the retainer ring 560. A seal 570, illustrated as a compressible O-ring seal, is fitted in the groove 568 and provides a fluid seal between the sleeve 520 and the retainer ring 560.

After the valve body housing 30 is seated on the shoulder 550 and the retainer ring 560 is in place preferably annular lip 554 of the valve body housing 30 adjacent the counterbore 548 is formed over and engages the upper surface of the retainer ring 560. The annular lip 554 secures the retainer ring 560 and valve body 500 in the bore 544 of the valve body housing 30. The annular lip 554 is preferably cone swaged using a swaging tool as described above for the embodiment of FIG. 8. In other embodiments, the lip 554 can be formed by any desirable manner. In yet other embodiments, the lip 554 can be formed as a segmented annular member.

It will be apparent to one skilled in the art that a hold/dump valve 22 can be formed with elements similar to the sleeve 520 and retainer ring 560 used in isolation valve 520'.

Figure 12:
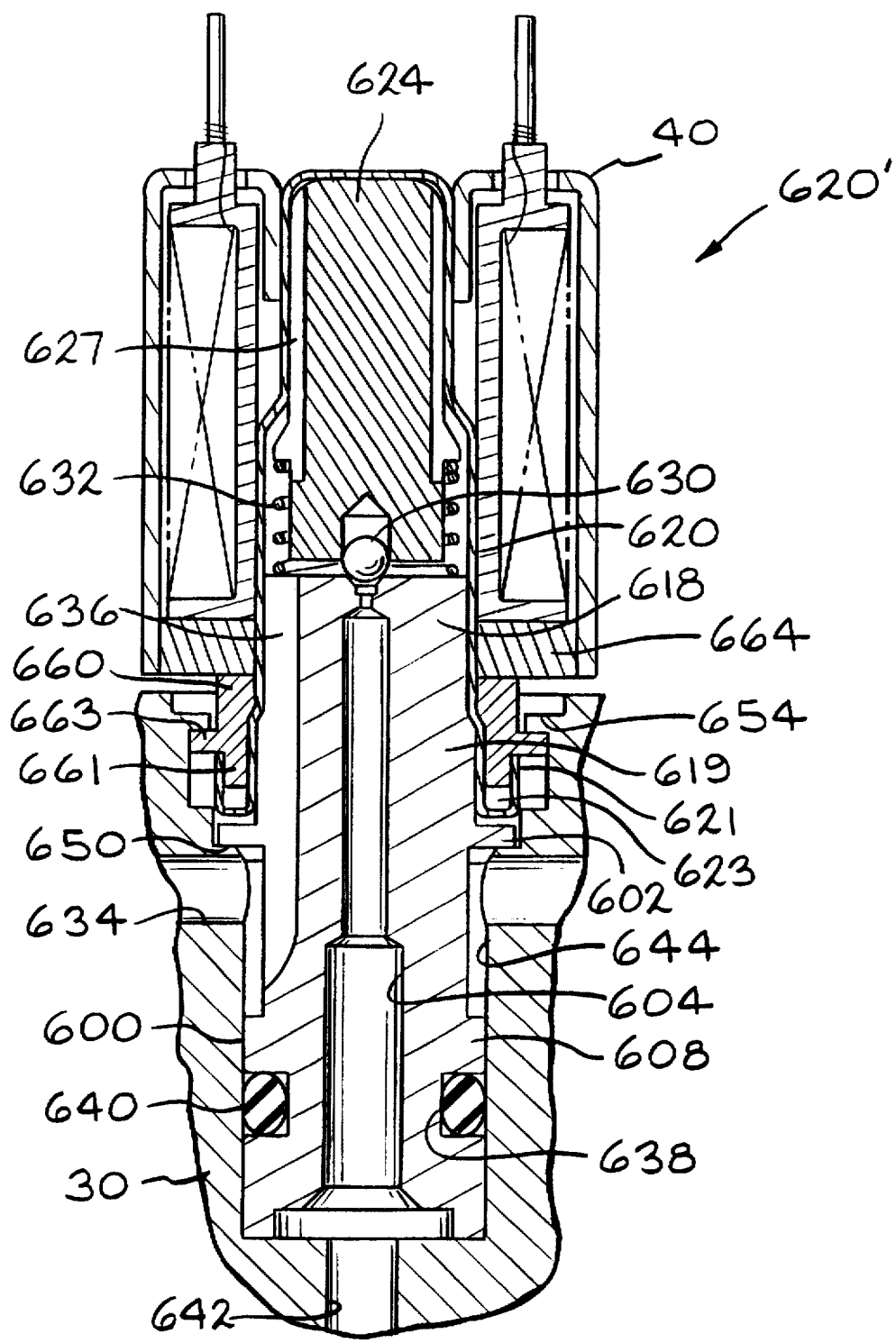
FIG. 12 is a sectional view of a sixth embodiment of an isolation valve according to the present invention.

A sixth preferred embodiment of an isolation valve 620' according to this invention is illustrated in FIG. 12. The isolation valve 620' includes a valve body 600 having a lower portion 608, an upper portion 618 and a radial flange 602 formed between the portions 608, 618. The upper portion 618 includes a stepped portion 619 having a larger diameter. A sleeve 620 is fitted over the upper portion 618 and stepped portion 619 and terminates in an upwardly projecting annular flange 621. A retainer ring or collar 660 includes an annular cylindrical portion 661 having an outer annular radial flange 663. Preferably, a lower portion of the cylindrical portion 661 has thickness which is complementary to and received in an annular gap 623 formed between the annular flange 621 and the sleeve 620.

After the radial flange 602 is seated on the shoulder 650 and the retainer ring 660 has been seated in the gap 623, a preferably annular lip 654 of the valve body housing 30 adjacent the bore 644 is formed over and engages the upper surface of the retainer ring 660. The annular lip 654 secures the retainer ring 660 and valve body 600 in the bore of the valve body housing 30. The annular lip 654 is preferably swaged using a swaging tool as described above for the embodiment of FIG. 4. In other embodiments, the lip 654 can be formed by any desirable manner. In yet other embodiments, the lip 654 can be formed as a segmented annular member.

It will be apparent to one skilled in the art that a hold/dump valve 22 can be formed with elements similar to the sleeve 620 and retainer ring 660 used in isolation valve 620'.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An anti-lock brake control unit for a braking system of an automotive vehicle having a master brake cylinder providing a pressurized brake fluid to slave cylinders of wheel brake assemblies in response to the depression of a brake actuator by an operator of the automotive vehicle, said control unit comprising:

an isolation valve having an internal portion, an external portion and a radial flange intermediate said internal and external portions, said external portion including an armature displaceable in response to a magnetic field to change said isolation valve from an open state to a closed state;

a hold/dump valve having an internal portion, an external portion and a radial flange intermediate said internal and external portions, said external portion including

15 an armature displaceable in response to a magnetic field to change said hold/dump valve from a closed state to an open state; and a valve body housing having a plurality of cylindrical cavities, wherein an internal portion of one of said isolation and hold/dump valves is received in each cavity, each cavity further having
  (i) a counterbore forming a shoulder at the bottom thereof for seating a radial flange of one of said isolation and hold/dump valves, and
  (ii) a swaged annular lip extending over a seated radial flange of one of said isolation and hold/dump valves, said swaged annular lip mechanically securing said radial flange against said shoulder and to said valve body housing and forming at least a secondary fluid seal between said radial flange and said valve body housing;

said valve body housing further having at least one inlet port for receiving pressurized brake fluid from the master cylinder, a plurality of outlet ports for transmitting pressurized brake fluid to the slave cylinders of the wheel brake assemblies, at least one low pressure accumulator, and internal passageways connecting said at least one inlet port to an input of said isolation valve, for connecting an output of said isolation valve to an input of an associated hold/dump valve and to an associated one of said outlet ports and for connecting the output of said hold/dump valve to at least one low pressure accumulator and for connecting said at least one low pressure accumulator to an input of said pump and for connecting an output of said pump to said input of said isolation valve.

2. The control unit of claim 1 further including a coil integrated module mounted to said valve body housing, said coil integrated module having a solenoid coil assembly, including a flux ring, for each isolation valve and each hold/dump valve mounted in said valve body housing, each flux ring of said solenoid coil assembly circumscribing a selected one of said external portions of said isolation and hold/dump valves and each solenoid coil assembly operative, when energized, to produce a magnetic field sufficient to displace said armature in said selected one isolation and hold/dump valves.

3. The control unit of claim 2 wherein the flux ring of each coil assembly is secured to the coil assembly at the end adjacent to said valve body housing.

4. The control unit of claim 2 wherein said isolation valve comprises:
  a cylindrical valve body having a first end and a second end, said radial flange disposed intermediate said first and second ends, a coaxial fluid passageway provided through said valve body, a valve seat provided at an end of said coaxial fluid passageway adjacent to said first end, and at least one offset fluid passageway providing a fluid passage from said one end of said valve body to a location intermediate said radial flange and said second end of said valve body;
  a cylindrical sleeve having a closed end and an open end, said open end being sealingly attached to said first end of said body;
  an armature disposed in said cylindrical sleeve resiliently biased away from said valve seat; and
  a valve member attached to said armature in alignment with said valve seat, said valve member operative to engage said valve seat blocking a fluid flow from said coaxial fluid passageway to said offset fluid passage-

16 way when said armature is displaced towards said valve body by the magnetic field generated by the associated solenoid coil assembly when energized.

5. The control unit of claim 4 wherein said valve body has a filter assembly attached to said second end of said valve body to filter the brake fluid received at said inlet port of valve body housing.

6. The control unit of claim 4 wherein said valve member is a ball.

7. The control unit of claim 1 wherein a swaging tool is orbited in a rosette pattern to swage the region of said valve body housing adjacent to said counterbore inwardly to form said swaged annular lip.

8. The control unit of claim 7 wherein said radial flange of each of said isolation and hold/dump valves, respectively, has a predetermined thickness, the depth of said shoulder formed at the bottom of said counterbore is approximately 2.0 mm greater than said predetermined thickness of said radial flange.

9. The control unit of claim 8 wherein said counterbore has a diameter of 0.05 to 0.15 mm smaller than said radial flange such that said radial flange is pressed into an interference fit with the internal wall of said counterbore.

10. The control unit of claim 9 wherein said valve body housing is swaged to a depth in the range from 0.4 mm to 0.8 mm.

11. The control unit of claim 10 wherein said valve body housing is swaged in an area circumscribing said counterbore having a diameter approximately 4.0 mm greater than the diameter of said counterbore.

12. The control unit of claim 9 wherein said valve body housing is swaged to a depth of approximately 0.6 mm.

13. The control unit of claim 9 wherein a portion of said radial flange is tapered to facilitate the insertion of said radial flange into said counterbore.

14. The control unit of claim 13 wherein said portion of said radial flange is tapered at an angle of approximately 15°.

15. The control unit of claim 13 wherein an upper surface of said radial flange is beveled.

16. The control unit of claim 9 wherein said radial flange is a spherical surface.

17. A valve control unit comprising:
  at least one solenoid valve having an inlet port, an exit port, an internal portion, an external portion, and a radial flange intermediate said internal and external portions, said external portion including an armature displaceable in response to a magnetic field; and
  a valve body housing having a valve cavity receiving the internal portion of said at least one solenoid valve, said valve cavity having a counterbore having a diameter selected to receive said radial flange, a seat for said radial flange provided at the bottom of said counterbore, axially locating an associated solenoid valve in said valve cavity, said valve body housing further having a circumferential swaged lip extending from the edge of said counterbore toward the center of said valve cavity, said swaged lip mechanically locking said radial flange against said shoulder and forming at least a secondary fluid seal between said radial flange and said valve body housing, said valve body housing further having a housing inlet port, a housing exit port, and internal fluid passageways connecting said housing inlet port to said inlet port of said at least one solenoid valve and connecting said housing exit port to said exit port of said at least one solenoid valve.

18. The valve control unit of claim 17 wherein said radial flange has a predetermined thickness, said shoulder formed at the bottom of said counterbore is located from an adjacent face of said valve body housing a distance approximately equal to said predetermined thickness of said radial flange plus approximately 2.0 mm.

19. The valve control unit of claim 18 wherein the diameter of said counterbore is approximately 0.05 to 0.15 mm less than the diameter of said radial flange.

20. The valve control unit of claim 17 further including a solenoid coil assembly for said at least one solenoid valve, said solenoid coil assembly circumscribing said external portion of said solenoid valve and capable of generating a magnetic field sufficient to displace said armature in said solenoid valve when energized.

21. The valve control unit of claim 20 wherein said solenoid coil assembly has an annular flux ring at an end adjacent to said valve body housing.

22. A valve mountable in a valve housing having a valve cavity and a counterbore forming a flange shoulder comprising:
- a cylindrical valve body receivable in the valve cavity, said valve body having a first end, an opposite end and a radial flange intermediate said first and opposite ends receivable in said counterbore and seatable on said flange shoulder;
- a concentric fluid passageway provided in said valve body extending from said first end to said opposite end, said concentric fluid passageway having a valve seat provided adjacent to said first end;
- an offset passageway provided in said valve body extending from said first end at a location radially offset from said concentric fluid passageway and exiting said valve body at a location intermediate said radial flange and said opposite end;
- a cylindrical sleeve having a closed end and an open end, said open end of said cylindrical sleeve sealingly attached to said first end of said valve body and said cylindrical sleeve extending concentrically therefrom;
- an armature slidably disposed in said cylindrical sleeve;
- means for biasing said armature relative to said valve body; and
- a ball valve attached to said armature in alignment with said valve seat, said ball valve blocking a fluid flow in said concentric fluid passageway when said ball valve is engaged with said valve seat.

23. The valve of claim 22 wherein said cylindrical sleeve is laser welded to said first end of said valve body.

24. The valve of claim 22 wherein said means for biasing, biases said armature in a direction away from said first end of said valve body displacing said ball valve away from said valve seat to form a normally open valve.

25. The valve of claim 24 further including a solenoid coil circumscribing said cylindrical sleeve for generating a magnetic field sufficient to displace said armature towards said first end of said valve body and to displace said ball valve against said valve seat.

26. The valve of claim 25 wherein said solenoid coil has an annular flux ring disposed at a location displaced from said closed end of said cylindrical sleeve.

27. The valve of claim 22 wherein said radial flange has a rim, wherein a portion of said rim is tapered.

28. The valve of claim 27 wherein said tapered portion of said rim is tapered at an angle of approximately 15°.

29. The valve of claim 22 wherein said radial flange has an upper edge, said upper edge of said radial flange is beveled.

30. The valve of claim 22 wherein said radial flange has a rim, wherein said rim is a curved surface.

31. A method for making a valve control unit having a valve housing and at least one valve disposed in said valve housing, said valve housing having a valve cavity provided therein for each of said at least one valves, each valve of said at least one valve having an internal portion, an external portion and a radial flange intermediate said internal and external portions, said method comprising:
- providing a counterbore in said valve housing concentric with each of said valve cavities, said counterbore having a diameter selected to receive the radial flange of said at least one valve, said counterbore forming an annular shoulder at the bottom thereof;
- inserting said internal portion of said at least one valve into a respective one of said valve cavities with said radial flange abutting said annular shoulder; and
- swaging a region of said housing adjacent to said counterbore in an inwardly direction to form an annular lip about each counterbore, said lip locking said radial flange onto said shoulder and forming a fluid tight seal between said radial flange and said housing.

32. The method of claim 31 wherein said radial flange has a predetermined thickness, said step of providing a counterbore provides said annular shoulder at a depth approximately equal to the thickness of said radial flange plus 2.0 mm.

33. The method of claim 32 wherein said step of swaging swages said region to a diameter approximately 4.0 mm greater than the diameter of said counterbore.

34. The method of claim 32 wherein said step of swaging swages said region to a depth between 0.4 and 0.8 mm.

35. The method of claim 31 wherein said step of swaging comprises the step of orbiting a swaging tool engaging said region about said counterbore in a rosette pattern to form said annular lip.

36. The method of claim 31 wherein said radial flange of said at least one valve has an outer rim and wherein a portion of said outer rim has a tapered portion to facilitate the location of the radial flange in said counterbore.

37. The method of claim 36 wherein said radial flange has an outer rim which is a curved surface.

38. A solenoid valve comprising:
- a cylindrical valve housing having a first chamber and a second chamber formed therein, said first chamber communicating with an inlet port and said second chamber communicating with an outlet port, said valve housing further having a valve seat provided between said first and second chambers;
- an armature disposed in said valve housing displaceable between a first position and a second position; and
- a valve member attached to said armature, said valve member formed from a substantially non-deformable material, said valve member engaging said valve seat when said armature is in said first position to inhibit a fluid flow from said first chamber to said second chamber and said valve member displaced from said valve seat when said armature is in said second position permitting a fluid flow from said first chamber to said second chamber.

39. The solenoid valve of claim 38 wherein said valve member is a ball.

40. The solenoid valve of claim 38 further including means for resiliently biasing said armature towards said first position and a solenoid coil for generating a magnetic field sufficient to displace said armature towards said second position.

41. The solenoid valve of claim 38 further including means for resiliently biasing said armature towards said second position and a solenoid coil for generating a magnetic field sufficient to displace said armature towards said first position.

42. A modular isolation valve control unit comprising:
   at least one isolation valve including a one-piece valve body having an internal portion, an external portion, and a radial flange intermediate said internal and external portions; and
   a valve housing member having a valve cavity in which said internal portion of said isolation valve is received, a counterbore forming a shoulder for said radial flange, and a swaged annular lip extending over an outer portion of said radial flange to lock said radial flange to said shoulder and secure said internal portion in said valve cavity.

43. The control unit of claim 42 wherein said radial flange has an interference fit with said counterbore to form a fluid tight seal therebetween.

44. The control unit of claim 42 wherein the diameter of said radial flange is approximately 0.2 to 0.6 mm larger than the diameter of said counterbore.

45. The control unit of claim 44 wherein said radial flange has a predetermined thickness, said shoulder formed by said counterbore is provided at a depth approximately equal to said predetermined thickness plus approximately 2.0 mm.

46. The control unit of claim 44 wherein an area of the valve housing member which is swaged to form the swaged lip has a diameter of approximately 4.0 to 8.0 mm greater than the diameter of the counterbore and is swaged to a depth from 0.4 to 0.8 mm.

47. The control unit of claim 43 wherein a portion of a rim of said radial flange is tapered to facilitate a press fit of said radial flange into the counterbore.

* * * * *